Feb. 10, 1970  L. A. AMTSBERG ET AL  3,494,429
PNEUMATIC TORQUE SENSING UNIT
Filed June 5, 1968  2 Sheets-Sheet 1
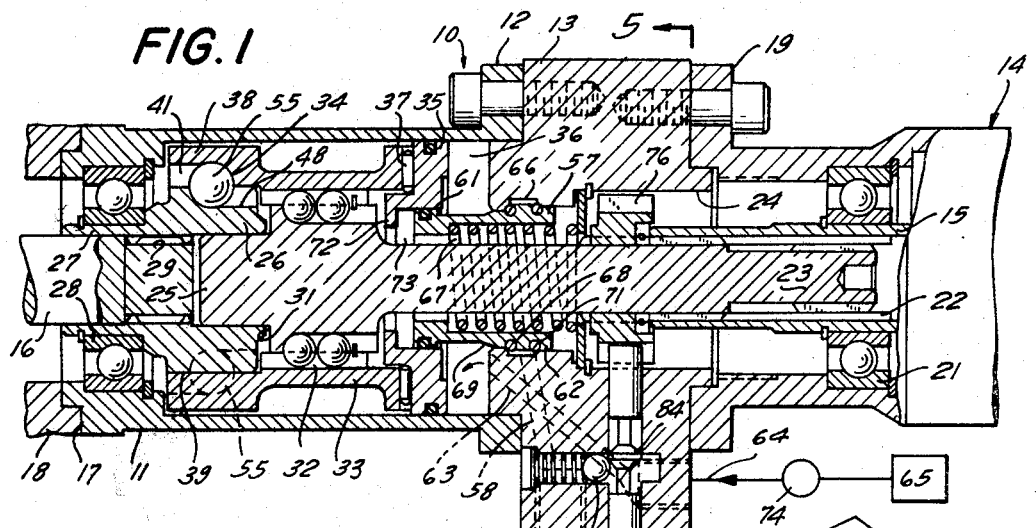
FIG. 1
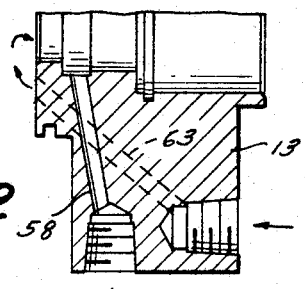
FIG. 2
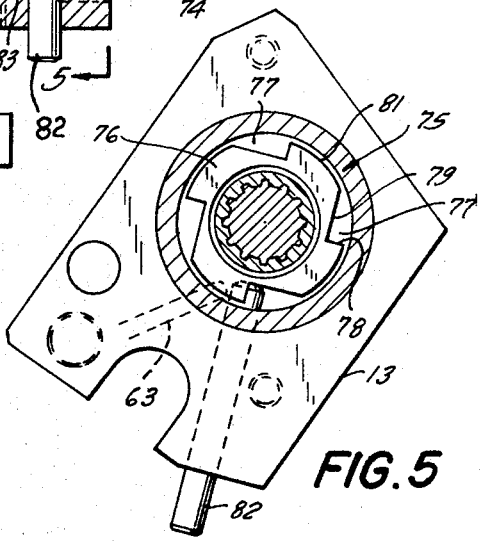
FIG. 5
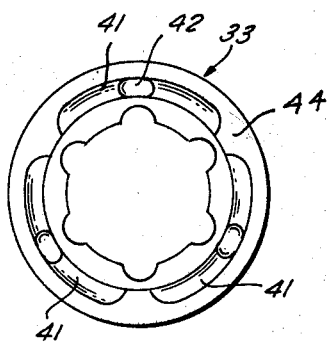
FIG. 3
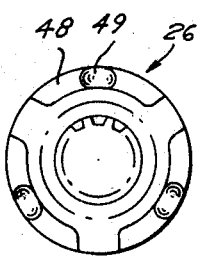
FIG. 6
FIG. 4
INVENTORS
LESTER A. AMTSBERG
WILLIAM K. WALLACE
BY
Stephen J. Rudy
ATTORNEY

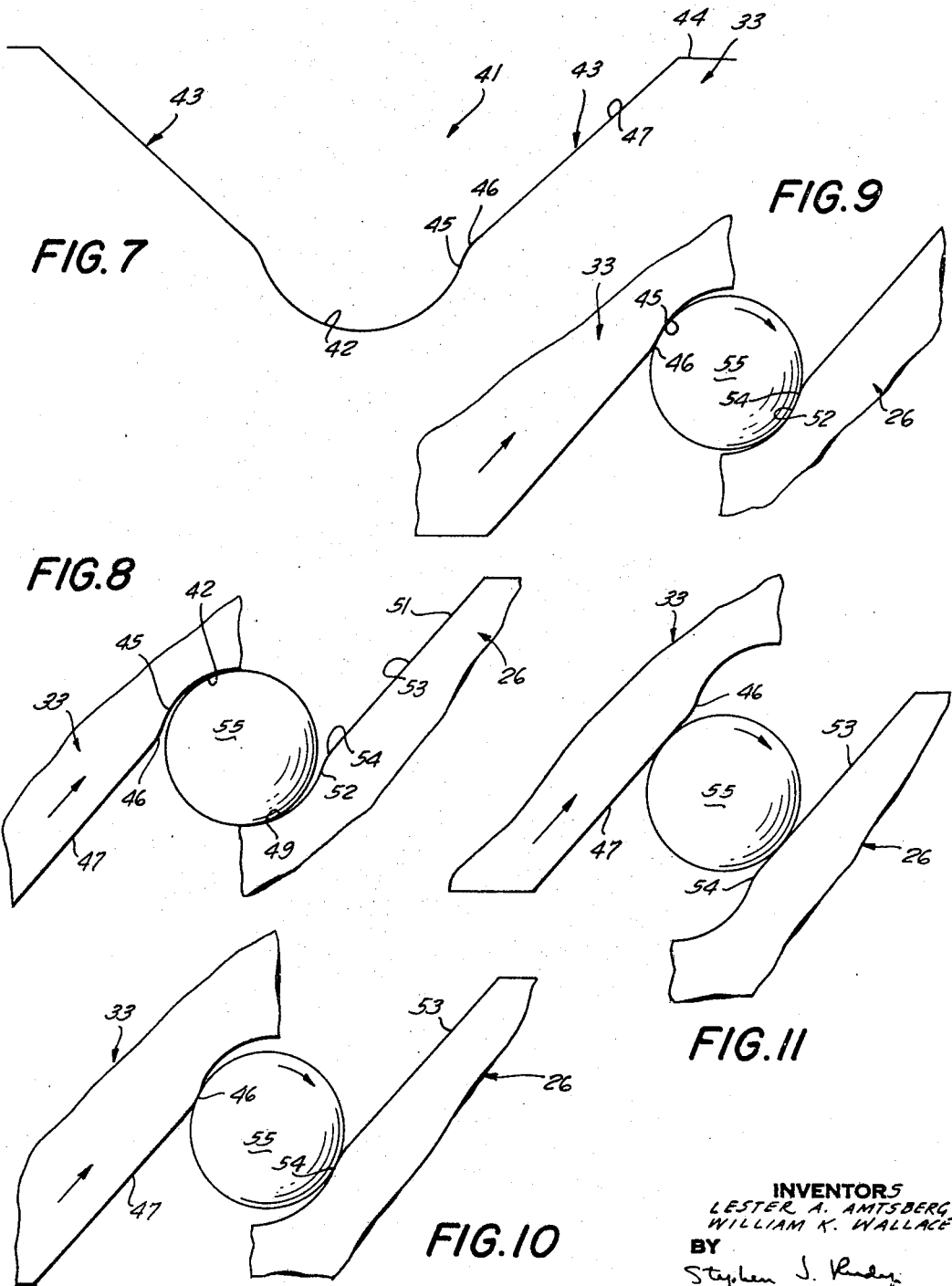

United States Patent Office 3,494,429
Patented Feb. 10, 1970

3,494,429
PNEUMATIC TORQUE SENSING UNIT
Lester A. Amtsberg, Utica, and William K. Wallace, Barneveld, N.Y., assignors to Chicago Pneumatic Tool Company, New York, N.Y., a corporation of New Jersey
Filed June 5, 1968, Ser. No. 734,812
Int. Cl. B25b 21/00; B23p 19/06; B23q 17/00
U.S. Cl. 173—12                                    10 Claims

ABSTRACT OF THE DISCLOSURE

A pneumatic torque sensing unit designed to be incorporated in a rotary tool between the output and work spindles of the tool. The torque of the output spindle is transmitted by means of a torque shaft through a cam clutch coupling to the work spindle. One of the clutch members is caused in response to development of a pre-set torque resistance in the work to separate from the other and move a piston against a pneumatic load in a pressure chamber to open a valve to vent the chamber. The vented fluid provides a pneumatic signal which operates a device indicating that the pre-set torque has been delivered to the work. Failure to apply this pre-set value of torque to the work will be indicated by a failure of the valve to open. A pin and gear latch is provided which is selectively operable by the operator to lock the torque shaft against rotation so as to permit a torque test wrench to be applied to the work spindle when the need for testing arises.

BACKGROUND OF THE INVENTION

This invention relates to a torque sensing unit or module intended to be incorporated into a rotary tool, such as a nut runner, for the purpose of issuing a pneumatic signal when the tool has delivered a pre-set value of torque to the work. The signal may be transmitted to and used to cause operation of any conventional indicating device.

A feature of the sensing unit is a coupling or cam clutch arrangement which transmits the torque of a driving shaft to a work spindle. One member of the clutch is adapted upon experiencing a predetermined torque overload to move away from the other against the bias of a pneumatically loaded piston. Consequent movement of the piston causes operation of a valve to vent the pneumatic load to provide a pneumatic operating signal to an indicating device.

Another feature which is ancillary to determining the pre-set torque value of the tool is latch means whereby a torque transmitting shaft of the tool may be selectively latched against rotation by the operator to permit application of a torque testing wrench to the work end of the tool.

BRIEF DESCRIPTION OF THE DRAWINGS

In the accompanying drawings:
FIG. 1 is a longitudinal section through a torque sensing unit embodying the invention, the unit being shown as incorporated in a conventional nut-running tool;
FIG. 2 is a fragmentary section through the valve block showing the feed and vent passages to the pressure chamber;
FIG. 3 is a detail of the clutch face of the driving clutch member;
FIG. 4 is a detail of the camming face of the driven clutch member;
FIG. 5 is a section on line 5—5 of FIG. 1;
FIG. 6 is a top plan view of the latch gear;
FIG. 7 is a profile view of one of the pockets and adjacent cam surfaces of the driving clutch member;

FIGS. 8–11 are schematic showings of the action of the clutch members during operation of the tool in which;
FIG. 8 shows the clutch members in normal condition during free running down of the work with the clutch balls seated in the pockets in unloaded condition;
FIG. 9 shows the balls as forced to a position at the start of the steep cam slopes at the end of the free running phase and entering the pre-set minimum torque delivery phase;
FIG. 10 shows the balls as being at the end of the steep slopes or pre-set torque delivery phase; and
FIG. 11 shows the balls as having been advanced to the reduced cam slopes, indicating that the pre-set minimum torque has been applied to the work.

DESCRIPTION OF PREFERRED EMBODIMENT

A pneumatic torque sensing unit or module embodying the invention is generally indicated at 10 in FIG. 1. It includes a casing 11 having an end flange 12 bolted to a valve block 13. The unit is shown as incorporated in a conventional pneumatic nut-running tool 14 between a motor driven output spindle 15 of the tool and a work spindle 16. The front end of the casing has a flanged connection 17 with a front end housing section 18 of the tool. The rear end of the valve block 13 is bolted to a housing flange 19 of the tool. The work spindle 16 carries a driving head or socket (not shown), adapted to engage a threaded fastener, such as a nut. The output spindle 15 is rotatably supported in a bearing 21 and is driven by means of a conventional air driven rotary motor of the vane type (not shown) of the tool. The output spindle has an internal splined driving connection 22 with a torque transmitting shaft 23 of the sensing unit. This shaft extends freely through a central opening 24 in the valve block; and it is supported at its front end by means of a pilot portion 25 in a bore of a driven cam clutch member 26 for relative rotation. The clutch member is journaled by means of a stem portion 27 in a bearing 28; and it has an internal splined driving connection 29 with the work spindle 16. The clutch member 26 is restrained against axial movement by means of the inner race of bearing 28 and a shoulder 31 of the torque shaft 23. The torque shaft has a ball spline and straight groove driving connection 32 with a surrounding driving cam clutch member 33 whereby the latter is rotatable with and has axial movement relative to the torque shaft. The clutch member 32 is drivingly connected by camming means 34 with the driven clutch member 26 whereby the torque of shaft 23 is delivered to the work spindle 16. The camming means is operable in response to a predetermined torque resistance offered by the work spindle to cause the driving clutch member to advance angularly and to separate axially relative to the driven clutch member against the bias of a pressurized piston 35. The piston acts under pneumatic pressure applied to a pressure chamber 36 at its rear to normally bias the driving clutch member 33 into fully engaged driving relation with the driven clutch member, as appears in FIGS. 1 and 8. A roller thrust bearing 37 positioned between opposed radial faces of the piston and the driving clutch member allows easy rotation of the latter relative to the piston.

The camming means 34, as best illustrated by FIGS. 1, 3–5, includes an annular skirt 38 at the forward end of the driving clutch member, which skirt surrounds the periphery of an annular rearwardly extending portion 39 of the driven clutch member. The inner wall surface of the skirt is formed with a group of three V-form grooves 41 (FIGS. 1, 3 and 7), centered circumferentially equally apart. Each of which has an inside radius at its apex defining a ball pocket 42. As best seen in FIGS. 3 and 7, the inside radius of pocket 42 of each groove forms part of the profile of a pair of symmetrical generally diverging cam surfaces 43. These surfaces diverge outwardly to the forward end wall 44 of the driving clutch member. Each cam surface 43 includes a short steep slope 45 which merges at one end with the high end of the inside radius of the pocket 42 and merges at the other with a small outside radius 46. The cam surface further includes a relatively long reduced slope 47 which declines outwardly from the outside radius 46 to the end wall 44. The peripheral surface of the portion 39 of the driven clutch member 26 is formed with three similar V-formed grooves 48 (FIGS. 1, 4, 8) having cam pockets 49 and cam surfaces 51, which pockets and cam surfaces complement those of the driving clutch member. The cam surface 51 includes a short steep slope 52 and a long reduced or declining slope 53 extending from an outside radius 54 to the extremity of the driven clutch member. The camming means 34 further includes a group of three cam balls 55, each normally seated, as in FIGS. 1 and 8 in part in a separate pocket 42 of the driving clutch member and in an opposed part of a pocket 49 of the driven clutch member.

In the operation of the tool, the clutch balls 55 have a normal position as in FIGS. 1 and 8 in the cam pockets under the biasing force of the piston 35 during the time the work spindle 16 runs the work down to an initial degree of tightness. As this initial degree of tightness is approached, the increase in torque resistance developing in the work causes the balls to roll toward the high ends of the ball pockets of both clutch members into contact with the corresponding short steep slopes 45 and 52, as in FIG. 9. At slight rearward and relative angular or twisting movement of the driving clutch member relative to the driven member accompanies this action. Once the balls are in this FIG. 9 position, a further increase in the torque resistance of the work forces the balls, as in FIG. 10, up the steep slopes over the outside radii 46, 54; and, as in FIG. 11, forces them onto the long reduced slopes 47, 53. A predetermined constant torque is delivered to the work as the balls ride over the steep slopes 45, 52. Further relative angular and rearward movement of the driving clutch member accompanies this action and forces the piston 35 rearwardly until it abuts the stationary valve block 13. The valve block prevents any further axial separation of the clutch members. Since the axial extent of the pressure chamber space 36 normally existing between the piston and the valve block is less than the depth of the V-formed grooves 48, the balls 55 cannot escape free of the clutch members. Accordingly, the driving clutch member can, when the limit of separation is reached, continue to drive through the camming means to increase the torque of the work; provided the operation of the tool has not been, in the meantime, terminated.

The primary function of the torque sensing unit is intended to issue a signal when a desired pre-set minimum value of torque has been delivered to the work. In this instance, a pneumatic signal is produced and is directed to a pneumatically operable indicating device 56 which will operate in conventional manner in response to the signal to indicate that the fastener has received the predetermined torque value. To this end, the rearward movement of the piston serves to move a valve 57 (FIG. 1) to open condition so as to allow the pressure air entering chamber 36 to escape through a vent passage 58 in the valve block to a line 59 connected with the control device 56.

The valve 57 is of tubular form, and is disposed with some clearance in surrounding relation to the shank of the torque shaft 23. It has a peripheral land 61 about its forward portion which bears upon the internal wall of a central opening of the piston. It also has a land 62 about its rear area which bears upon an internal wall of the central opening 24 of the valve block. A passage 63 for feeding live air into the pressure chamber block opens at one end into the pressure chamber and is connected at its opposite end by a line 64 to a source of constant pressure air 65. An annulus 66 in the internal wall of the valve block 13 communicates with the vent passage 58. A closing spring 67, disposed between an internal shoulder of the valve and a stationary retainer ring, biases the valve forwardly so as to seat an O-ring 68 closed upon an internal annular shoulder of the valve block. The closed condition of the valve seals off escape of pressure air from the chamber 36 around a conical neck 69 of the valve to the annulus 66.

The pressure chamber 36 is of doughnut form. It is defined around the neck 69 of the valve between the opposed radial walls of the piston and the valve block. The chamber is normally sealed against leakage by O-rings in the piston and in the valve block; and by O-rings in the lands of the valve. When the valve is moved to open conditions, air from the chamber flows around the coned neck 69 to the annulus 66 from where it passes through the vent passage 58. A further O-ring 71 serves to prevent leakage of the venting air from the annulus 66 around the land 62 to the back of the valve. The piston is formed with an internal annular lip 72 which, in the normal condition of the piston as in FIG. 1, as spaced by a clearance 73 forwardly of the valve 57. This lip is caused to abut and move the valve to open condition upon rearward movement of the piston by the driving clutch member. The clearance 73 provides an initial distance of travel for the piston which serves to delay actuation and opening of the valve until after the cam balls 55 have passed over the steep cam slopes 45, 52 onto the reduced cam slopes 47, 53. In this manner, the spring load 67 of the valve is prevented from increasing the desired minimum torque delivered while the balls are upon the steep slopes. The axial dimension of the clearance 73 is about half the axial dimension of the pressure chamber 36. The valve is actuated to open condition at just about the time that the balls have moved onto the reduction slopes 47, 53. Upon opening of the valve, the pressure air entering the chamber 36 vents through the escape passage 58. The piston, however, continues to move rearwardly with the driving cam being dampened in its movement by the load of the valve spring 67. The indicating device 56 will have ben operated by the pneumatic signal issuing from the vent passage 58, indicating that the predetermined minimum value of torque has been applied to the work.

The value of torque at which the cam balls 55 will be forced to ride over the steep cam slopes 45, 52 can be varied by increasing or decreasing the pressure of air supplied to the chamber 36. This may be done by use of a pressure regulator 74 inserted in the feed line 64.

Manipulative latch means 75 (FIGS. 1, 5, 6) is provided to lock the torque shaft 23 against rotation. This enables a torque wrench to be applied to the work spindle 16 to measure the torque required to operate the device when live air of a given pressure is applied to the rear of the piston 35. The latch means includes a gear 76 located in the central opening 24 of the valve block and splined to the torque shaft 23. The gear has an annular body in the periphery of which is provided a succession of steps 77. Each step comprises a short radial shoulder 78 which is perpendicular to a land 79 that extends outwardly to the periphery of the body. The extremity of the land 79 of each step is spaced from the shoulder 78 of the next step by means of a segment 81 of the periphery. A manipulative pin 82 slidable in a bore of the valve block that is radial to the axis of the body of the gear is settable to lock the gear and, as a consequence, the torque shaft 23 against rotation in a reverse direction during testing. The pin projects in part externally from the valve block 13. When it is desired to lock the torque shaft for testing purposes, the pin is manually pressed inwardly, and the torque shaft is manually rotated as needed until the pin engages one of the lands 79. The torque shaft is then rotated counterclockwise until the shoulder 78 of the step abuts the pin as in FIGS. 1 and 5. The face of the shoulder 78 is contoured, as best seen in FIG. 6, to the radius of the pin. A spring loaded ball detent 83 is provided to releasibly lock the pin in its set position. For this purpose, the pin has a neck between its ends formed with a bead 84 having opposed coned surfaces. The ball detent is adapted to engage in the neck of the pin to one side or the other of the bead 84, accordingly, as the pin is depressed inwardly or outwardly. When the pin is engaged with a shoulder 78 of the gear, the torque shaft is locked against rotation in a reverse direction. The pin is automatically released from its locked position against the force of the detent by means of a camming action of the land 79 as the torque shaft and gear are rotated in a forward direction.

What is claimed is:

1. In a nut running tool including a work spindle, a drive shaft, and a torque separable cam clutch drivingly connecting the shaft to the spindle, the clutch having a driven part connected to the spindle and a driving part connected to the shaft, the driving part adapted upon delivery of a pre-set torque to the spindle to separate axially from the driven part; the improvement comprising a pneumatically biased piston arranged to yieldably resist said axially separation of the driving part; a chamber containing the piston subject to continuous entry of live air of a constant pressure biasing the piston against the driving part, a vent passage connected with the chamber, valve means normally closing the vent passage, and valve actuating means carried by the piston having cooperation with the valve means after the piston has yielded to axial separation of the driving part for a predetermined degree to move the valve means to open condition so as to allow live air entering the chamber to escape through the vent passage, the escaping live air providing a pneumatic signal indicative of the pre-set torque having been delivered and held for the interval of said predetermined degree.

2. In a nut running tool as in claim 1, wherein the valve means comprises a slide valve and a spring biasing the valve to closed condition, and the valve actuating means is an abutment on the piston normally spaced a pre-set distance forwardly of the valve means, the spacing determining the degree the piston is required to yield to enable cooperation of the abutment with the valve means.

3. In a nut running tool as in claim 1 wherein the vent passage is connected to a pneumatically operable indicator.

4. In a nut running tool as in claim 1, wherein the chamber is connected by means of a pressure air feed line with a source of pressure air, and means is connected in the line for selective regulation of the pressure of air entering the chamber, whereby the resisting force of the piston to axial separation of the driving part may be varied.

5. In a nut-running tool including a driving spindle, a work spindle, and a pneumatically operable indicator, a torque sensing and signal producing module drivingly connecting the driving spindle to the work spindle, the module comprising: a torque transmitting shaft coupled to the driving spindle; a torque sensitive separable coupling having a driven member connected to the work spindle and a driving member connected to the shaft; camming means interconnecting the driving and driven members adapted upon sensing transmission of a pre-set torque to the work spindle to cause axial separation of the driving member relative to the driven member; a pneumatically pressured piston continually pressing upon the driving member and yieldably resisting said axial separation of the driving member; a piston chamber continually subject to entry of live air of a constant pressure forcing the piston against the driving member; a vent passage connecting the chamber with the pneumatically operable indicator for issuing a pneumatic operating signal to the indicator; valve means normally blocking the vent passage from issuing said signal; and valve actuating means responsive to axial separation of the driving member from the driven member for a predetermined distance to actuate the valve means to open condition so as to allow issuance of said pneumatic signal from the chamber through the vent passage to the indicator.

6. In a nut-running tool as in claim 5, wherein a thrust roller bearing is disposed between the piston and the driving member, whereby the thrust of the piston is transmitted to the driving member, and whereby the driving member has rotation relative to the piston.

7. In a nut-running tool as in claim 5, wherein the valve actuating mechanism is an abutment on the piston fronting the valve means with a pre-set clearance and is cooperable with the valve means upon yielding of the piston as a consequence of axial separation of the driving member and upon closing of said clearance to move the valve means to open condition.

8. In a nut-running tool as in claim 7, wherein latch means is provided for selectively releasably locking the shaft against rotation in a particular direction so as to allow a torque test wrench to be applied to the work spindle, the latch means including a gear fixed to the shaft having at least one step formed in its periphery having a radial shoulder and a land substantially at right angles thereto, a housing block, a latch pin selectively slidable in the block in front of the radial shoulder into or out of engagement with the land, and detent means engageable with the pin so as to releasably latch it in its selectively moved position, the pin when engaged with the land having cooperation with the shoulder to lock the gear and shaft against rotation in one direction, and the land having cooperation with the pin upon rotation of the gear and shaft in the opposite direction to cam the pin against the detent means out of such engaged relation.

9. In a nut running tool including a work spindle (16), a drive shaft (23), and a torque separable cam clutch (26, 33) drivingly connecting the shaft to the spindle; a piston (35) subject to constant pressure of pneumatic fluid yieldingly resisting separation of the clutch, a vent (58), a slidable valve (57) normally closing the vent, the valve being actuable by means of the piston following a predetermined degree of yielding movement of the piston as a consequence of separation of the clutch so as to cause relief of the pneumatic fluid through the vent, and a pneumatically responsive signal device (56) connected to the vent.

10. A nut running tool as in claim 9, wherein control means (74) is provided for selectively varying the pressure of the pneumatic fluid against the piston (35).

References Cited

UNITED STATES PATENTS

| 3,253,662 | 5/1966 | Sacchini | 173—12 |
| 3,263,785 | 8/1966 | Krouse et al. | 192—150 |
| 3,406,762 | 10/1968 | Kramer | 173—12 |

ERNEST R. PURSER, Primary Examiner

U.S. Cl. X.R.

81—52.5